March 14, 1944.  J. J. VIENNEAU  2,344,334
HIGH VOLTAGE WINDING
Filed Aug. 2, 1940
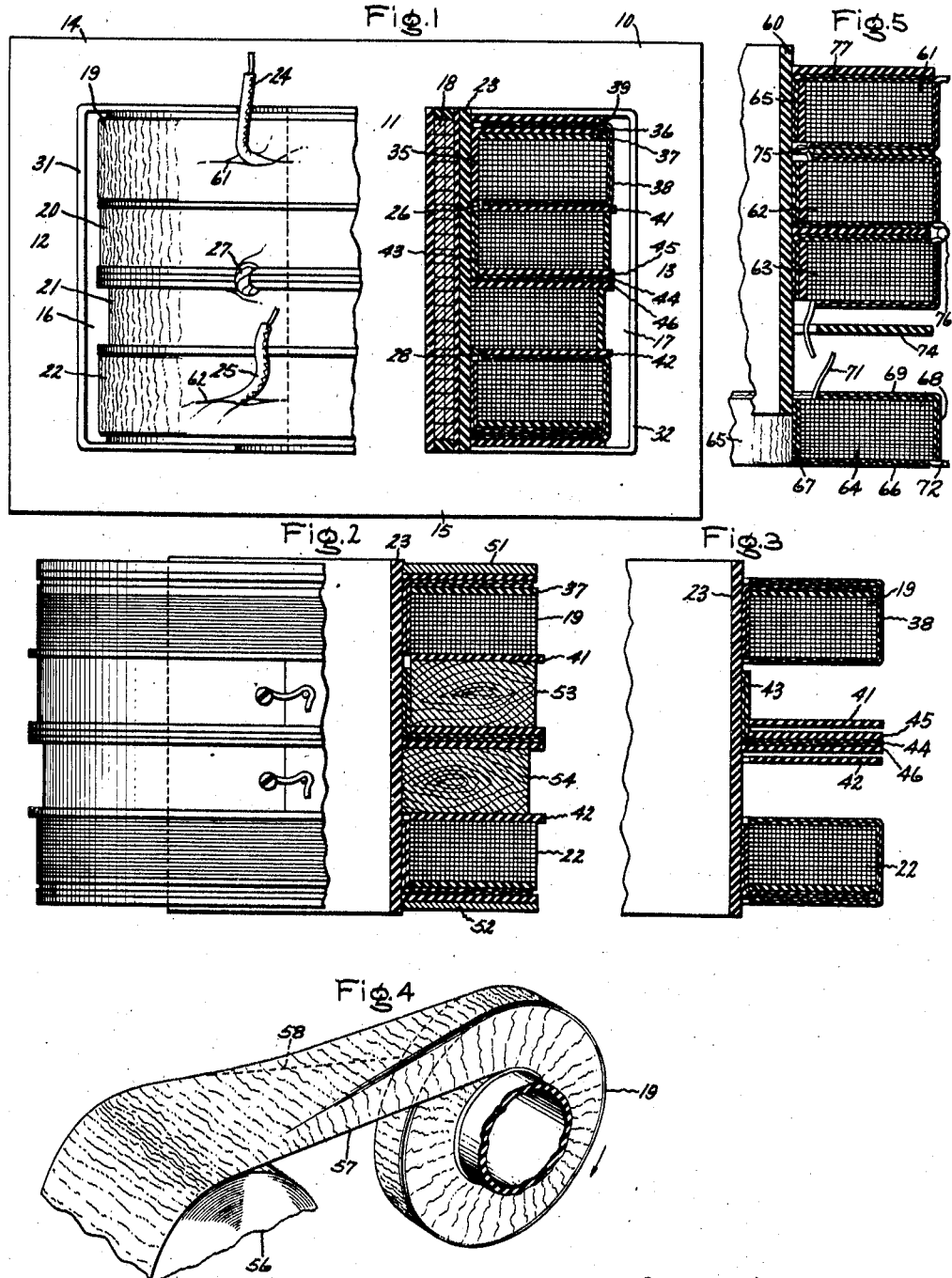
Inventor:
Jacob J. Vienneau,
by Harry E. Dunham
His Attorney.

Patented Mar. 14, 1944

2,344,334

UNITED STATES PATENT OFFICE 2,344,334

HIGH VOLTAGE WINDING

Jacob J. Vienneau, Pittsfield, Mass., assignor to General Electric Company, a corporation of New York Application August 2, 1940, Serial No. 349,516

7 Claims. (Cl. 175—362)

My invention relates to windings for electrical induction apparatus and more particularly to insulation arrangements for such windings and methods for making the same. While the invention is not to be necessarily limited thereto, it is particularly applicable in the construction of high voltage transformer windings.

Certain types of high voltage windings such as those sometimes used in distribution transformers, comprise a plurality of coaxial cylindrical coil sections arranged in a side by side manner upon a supporting cylinder. The coils are connected in series, usually by crossover connections alternately between the corresponding inner and outer turns of adjacent coils. In the case of any two adjacent coils the ends which are connected together will be at substantially the same voltage, while the opposite ends which are connected to other adjacent coils will be at relatively widely differing potentials so that in insulating the two coils from each other, little insulation is needed between those portions which are connected together, while greater insulation is required as the voltage stress between adjacent coil portions is increased and which is a maximum between the ends opposite the connection. In the case of a transformer in which the space factor with regard to the core structure is of major importance, it is desirable to maintain the spacing between adjacent coils of the high voltage winding at a minimum and limit the thickness of the solid dielectric about the coils to some reasonable value. It is not enough to merely provide a thickness of solid insulation between the coils for the reason that while such insulation may provide adequate protection against puncturing, breakdown may also be caused by surface creepage around the edges of the intercoil insulation. The latter phenomena requires the extension of the edge of at least a portion of the solid intercoil insulation materially beyond the adjacent coil edges to provide requisite high resistance creepage paths. The insulation arrangements heretofore used for such purposes involved expensive materials which had to be applied in a painstaking manner resulting in a high overall cost for the winding.

It is therefore an object of the present invention to provide new and improved arrangements of insulation for high voltage windings of the type described which are electrically strong, utilize relatively inexpensive materials, and which are relatively low in manufacturing cost.

It is a further object of the present invention to provide a new and improved method of manufacturing a winding of the type described so insulated whereby a small space factor and long, high resistance creepage paths are provided between parts of differing potentials in a simple and efficient manner.

Further objects and advantages of the invention will become apparent as the following description proceeds taken in connection with the accompanying drawing, while its scope will be pointed out with greater particularity in the appended claims.

Referring to the drawing, Fig. 1 is a side elevation partly in section of a transformer constructed in accordance with the invention; Figs. 2, 3, and 4 are different views illustrating various steps in accordance with the method of my invention as applied in the manufacture of the high voltage winding embodied in the transformer shown in Fig. 1; and Fig. 5 is a fragmentary cross-sectional view of a partly assembled high voltage winding illustrating a second modification of the invention.

Referring now to Fig. 1 of the drawing, the invention will be described as it may be applied to a high voltage winding of a transformer, although it will be apparent to those skilled in the art that this is but one form of a winding for electrical induction apparatus to which the invention is applicable. The transformer shown comprises a core structure 10 having a winding leg 11, a pair of outer legs 12 and 13, and yoke portions 14 and 15 defining windows 16 and 17. Arranged upon the winding leg 11 and suitably insulated therefrom is a low voltage winding indicated at 18 which in turn is surrounded by a high voltage winding consisting of a plurality of cylindrical coil sections, which, in this instance, are four in number, 19 to 22, inclusive. The high voltage winding coils for a transformer of the type herein described are usually of the layer wound type, that is, each layer of conductor turns is separated by a layer of relatively thin insulation such as paper. The coils are arranged coaxially in a side by side relation upon the cylinder 23 which provides the major insulation between the high and low voltage windings. The coils are connected together in a series relation between the terminal leads 24 and 25 which are connected to the outer end turns of the end coils 19 and 22, respectively. The corresponding inner end turns of coils 19 and 20 are connected together by a crossover indicated at 26, the outer end turns of coils 20 and 21 are connected as indicated at 27, while coils 21 and 22 have their inner end turns connected as indicated at 28. This type of connection is commonly known in the art as a start to start and finish to finish connection and it will be readily understood that adjacent coils must be wound in opposite directions from the inside out in order that they will function properly as a winding.

With the winding coils connected as shown and the terminal leads connected to a high voltage energizing source of supply (not shown), it will be apparent that a relatively slight difference in voltage will exist between the connected inner end layers of the pairs of coils 19 and 20, and 21 and 22, and between the outer end layers of the pair of adjacent coils 20 and 21. A relatively large voltage difference, however, will occur between the corresponding end turns of adjacent coils which are not connected together such as the corresponding outer turns of the adjacent coils 19 and 20 and coils 21 and 22, and similarly also between the inner end turns of two adjacent coils 20 and 21. A large voltage difference will also exist between the high voltage winding and the core, which is usually grounded, and between the high and low voltage windings. To safeguard against arcover between points of different voltages, solid insulation must be provided between such points not only of such thickness as will effectively resist puncturing but also the surfaces of such insulation must extend beyond the points of localized high voltage stress so far that the creepage path around the edges of the insulation between such points will be of such high resistance as to effectively minimize the possibility of breakdown along such paths. In the transformer shown the three sides of the core windows 16 and 17 surrounding the high voltage winding are lined with conventional sheets 31 and 32 of a suitable insulating material such as fiber or pressboard but because of the various leads which must be brought out from the windings these sheets cannot be of such a width as will provide the necessary long creepage path between the coils and the core structure. Furthermore, while the insulating cylinder 23 is of such thickness to provide adequate protection against arcovers between the high and low voltage windings by puncturing, the creepage distance between them around the ends of the cylinder is relatively short. It is therefore a further object of the present invention to provide a relatively simple and inexpensive insulation arrangement for a plurality of winding coils whereby long, or high resistance paths are provided not only between parts of adjacent coils of differing voltages but also between such coils and the core structure and between such coils and a low voltage winding.

The physical arrangement of the coil insulation will be described first, and subsequently the novel methods by which it is applied. Since the two end coils 19 and 22 are similarly insulated, only one of these coils, 19, will be described in detail. A cylindrical portion or flange 35 of a width substantially equal to the axial width of the coil extends between the coil 19 and cylinder 23, and which portion or flange is circumferentially integral with the inner edge of the annular ring 36 which extends over the outer end of the coil substantially to its peripheral edge. The flanged ring 35, 36 is preferably made of crepe paper preformed in accordance with the method outlined in my prior Patent No. 2,167,539 dated July 25, 1939, on a "Method of making flanged cylinders," and assigned to the General Electric Company, the assignee of the present application. By this flanged ring a long, high resistance creepage path is provided between each end coil and the low voltage winding around the ends of the cylinder 23. A ring 37 of insulating material such as pressboard is provided between the ring portion 36 and the end face of the coil 19 for reasons to be pointed out later. The peripheral side and the two ends of the coil including rings 36 and 37 are covered with a wrapping 38 of insulating material, preferably of crepe paper or some other suitable elastic insulating material applied in a manner to be presently described, and which in cross-section, as viewed in the right-hand portion of Fig. 1, is U-shaped so as to substantially enclose the coil. A ring 39 of insulating material, which may also be of pressboard, is arranged between the covered coil 19 and the adjacent portions of the sheets 31, 32 lining the core windows. By the continuous wrapping 38 completely covering the outer periphery and the previously covered coil ends facing the core yokes the creepage path from the end coils to the adjacent parts of the core structure is lengthened to a distance at least equal to the radical width of the coils. It will be noted further that the wrapping 38 also extends continuously from the periphery of the end coils over the ends facing the next adjacent coils thereby providing long creepage paths between the outer turns of the adjacent pairs of coils which are at different potentials. By the provision of insulating rings 41 and 42 the puncture strength of the insulation between the end coils and those adjacent thereto is raised to the desired amount.

In the case of coils which have their corresponding outer turns connected together, such as the intermediate coils 20 and 21, the corresponding inner turn layers are at relatively widely differing potentials and these portions must be fully insulated from each other. As indicated, the coil 20 is wound upon the cylindrical or flanged portion 43, which is of substantially the same axial width as the coil, and which flanged portion is circumferentially integral with the ring portion 44 extending between the coils 20 and 21. The flanged ring 43, 44 is preferably similar to the flanged ring 35, 36 described above. The insulation between the two coils 20 and 21 is increased by the annular insulating rings 45 and 46 to provide the desired puncture strength at this region of greatest stress. As regards intercoil insulation, while in this modification only one flanged ring is shown separating adjacent coils, it is obvious that two such rings may be provided back to back with the cylindrical portions extending across each of the two adjacent coils to provide the desired high resistance creepage path between the layers of the two coils which are at different potentials as will be described in connection with a second modification of the invention.

Referring now particularly to Figs. 2, 3, and 4, the method by which the winding is constructed and insulation applied will be described in greater detail. The various coils are wound upon the insulating cylinder 23 and the insulation provided thereon with the cylinder mounted in a lathe, or other suitable winding machine. Usually in such a winding machine the cylinder will be mounted horizontally but in the drawings, vertical views are shown in order that the relation between the construction steps and the finished transformer of Fig. 1 can be more readily perceived. Before the winding operation is begun the various insulating rings and flanged rings are slid over the end of the cylinder 23 and are suitably spaced thereon, and backing plates 51 and 52 suitably secured relative to the opposite ends of the cylinder 23. The two end coils 19 and 22 are then wound first, with spacer dummies 53 and 54 filling the space to be later occupied by the coils 20 and 21. The smooth surfaced fiber or pressboard rings 37 and 41 form the side walls of the space into which the coil 19 is to be wound and corresponding rings form the side walls of the space for coil 22. When the coils 19 and 22 have been wound upon the cylindrical flanges 35 of rings 36, the end plates 51 and 52, end rings 39, and the dummies 53 and 54 are removed and the various insulating members extending around the cylinder between these two coils are moved away therefrom such as to a point midway therebetween as shown in Fig. 3. The wrapping 38 of a suitable elastic insulating material such as crepe paper is then applied to the outer surface of the coils including the rings 36 in a manner as illustrated in Fig. 4. The crepe paper is fed onto each coil from a corresponding roll 56, the paper web being of a width substantially equal to the axial width and twice the radial dimension of the coil. The corrugations of the crepe paper extend axially of the coil and the paper is stretched as it is wrapped onto the coil by any suitable means tending to tension the web, such as a brake (not shown) applied to the roll 56. Because of the fact that the paper as so arranged readily yields circumferentially of the coil, the projecting outer portions of the web 57 and 58 will fit snugly against the opposite ends of the coil. After the desired number of wrapping turns have been applied the web may be severed and the end secured to the coil by a suitable adhesive. The coils with the outer wrapping applied are shown in cross-section in Fig. 3.

The insulating rings 41 and 42 are then moved over adjacent the corresponding coils, the flanged ring 43, 44 and the rings 45 and 46 on the opposite sides thereof are properly positioned, and the two coils 20 and 21 are then wound, suitable connections having been made to the inner ends of the coils 19 and 22. The outer turns of the two coils 20 and 21 are then connected together, as indicated by the crossover 27, and a few wrappings of insulating paper are provided over the outer surface of these coils. Because of the fact that the outer ends or terminal leads of the coils 19 and 22 were covered over by the wrapping 38, this covering is slit through as with a sharp edged knife, as indicated at 61 and 62, for the purpose of bringing out the leads for the connection thereof to the transformer terminals. It is to be understood, of course, that the leads will be brought out at points a safe distance from the core structure, as indicated clearly in Fig. 1.

The cross-sectional U-shaped insulation wrapping for the end coils 19 and 22 is preferred in certain types of transformers since it provides long creepage paths from both outside edges of the coils to adjacent parts, that is, from the outer peripheral edge to the core yoke and from the inner peripheral edge to the outer turns of the adjacent winding coil. Since it is generally preferred to wind the various coils directly upon the supporting cylinder 23 to avoid as much as possible the formation of air pockets therebetween, it is obvious that the insulation wrapping cannot be practically applied to two coils which are to occupy immediately adjacent positions in the completed winding without having air pockets therebetween. It is therefore necessary that the coils to be insulated in this manner be wound before the adjacent coils are wound in order that ample space will exist on the opposite sides of such coils so that the edges 57 and 58 of the web will have room to fold over the corners of the coils. If the various coils are not required to be wound directly upon the supporting cylinder in the position they are finally to assume, the coils may all be wound separately upon suitable mandrels and insulated as described and then be connected together and the cylinder slid through their aligned openings.

In some types of structures the requisite high creepage strength from the winding to the core can be readily provided by other means such as by a liner in the core windows of a sufficient width and for these or other reasons, it may not be desired to provide the cross-sectional U-shaped wrapping for the end coils as described above. In the modification of the invention illustrated in Fig. 5 the winding coils are insulated as to provide high resistance creepage paths between the end coils and the low voltage winding and between adjacent coils by means of cross-sectional L-shaped insulation only. Each of the plurality of coils 61 to 64, inclusive, is wound upon a preformed flanged ring of insulating material comprising a cylindrical portion 65 and an integral ring portion 66 extending outwardly therefrom to a distance substantially equal to the depth of the coils. These preformed flange rings are similar to the corresponding elements described above and are preferably made as described in the above mentioned patent. The outer peripheral surface of each coil and the end thereof opposite to the end covered by the ring portion 66 are covered with a wrapping comprising a plurality of turns of crepe paper applied in a manner as previously described and illustrated in Fig. 4, except in this instance the paper web is of a width corresponding to the axial width of the coil plus the radial thickness of the coil. If the coils are to be wound upon the insulating cylinder 60 in their final position, then it will be necessary for reasons previously mentioned to form the opposite end coils first and then provide the outer insulation wrapping thereupon before the intermediate coils are wound. The coils may, however, each be wound individually as illustrated by coil 64 upon a short cylindrical section 67 of relatively rigid insulating material such as fiber or pressboard and then wrapped with crepe paper covering the outer side and one end of the coil as indicated at 68 and 69, respectively. This wrapping is L-shaped in cross-section and cooperates with the flanged ring 65, 66, which may be fitted onto the wound coil, to substantially enclose the same.

It will be observed that the coil ends 71 and 72 can be readily brought out between the diagonally opposite adjacent edges of the insulation portions 65, 69 and 66, 68, for connection to an adjacent coil, and a terminal lead, respectively. The coils so insulated may then be stacked with additional insulating rings 74 arranged therebetween and connected together as indicated by the crossovers 75 and 76. The insulating cylinder 60 may then be slid through the aligned openings of the coils, the end insulating rings 77 applied and the winding assembly is completed.

As in the previously described modification, a long, high resistance creepage path is provided by the flanged rings 65, 66 between the end coils and the secondary winding around the ends of the cylinder 60. While in the previous modification the intercoil insulation providing the high resistance creepage path between the adjacent layers of differing potentials of two adjacent coils consisted of a single layer extending across one side and one end of one coil, in this modification the adjacent ends and corresponding sides of both coils are covered, thereby providing a creepage path between coils of greater length than in the first instance.

It will be appreciated that the insulation 68, 69 may be preformed if desired and merely fitted over the wound coils, but it is preferred to wrap this outer insulation on, as described, because of the small variations in outer dimensions of the coils inherently resulting in the winding operation. It is a usual practice to treat the assembled winding in a vacuum chamber and impregnate the unit with a suitable plastic compound and unless the insulation is compact and fits snugly against the coils, small voids may exist in the finished structure which, of course, are undesirable for numerous well-known reasons. Wrapping of the outer insulation upon the coils as described minimizes the likelihood of there being any such voids in the finished winding.

Having described the principle of my invention in what I now consider to represent the best embodiments thereof, I desire to have it understood that the specific forms and methods described are merely illustrative and that the invention may be carried out in other ways.

What I claim as new and desire to secure by Letters Patent of the United States is:

1. A winding for electrical induction apparatus including a pair of adjacent coaxial cylindrical coils, the inner end turns of said coils being connected together, an insulating member having a flange portion extending across an axial surface of one of said coils and an integral ring portion extending over the end of said one of said coils remote from the second of said coils, and a wrapping of insulating material on said one of said coils providing a relatively long creepage path between the adjacent outer turn layers of said coils, said wrapping substantially covering said ring portion and the outer surface of said one of said coils and fitting snugly against the coil surface facing the second of said coils.

2. A winding coil for electrical induction apparatus comprising a plurality of turns of the wire arranged in a plurality of layers, an insulating member having a flange portion extending across an axial surface of said coil and an integral ring portion extending over an end thereof, an insulation covering for said coil comprising a plurality of layers of crepe paper wound tightly around the outer peripheral surface of said coil, the paper being of a width greater than the width of the coil, the corrugations of the paper extending axially of the coil and the outer edge portions of the paper layers snugly overlying said ring portion and the end portion of said coil opposite the end covered by said ring.

3. The method of insulating a winding coil having a pair of leads extending from opposite edges of the inner and outer sides thereof which comprises winding said coil upon the flange portion of a preformed flanged ring of insulating material, wrapping a web of elastic insulating material having a width substantially equal to the axial and radial widths of the coil circumferentially about the coil with one edge of the web extending beyond the edge of the coil opposite said ring, stretching said web as it is wound upon the coil whereby said web edge folds over substantially covering the end of said coil.

4. The method of insulating a cylindrical coil having leads extending from opposite edges of the inner and outer sides thereof which comprises covering the inner side and one end of the coil with a flanged ring of insulating material, wrapping the outer peripheral surface of the coil with an elastic insulating material with one edge of the material extending beyond one edge of the coil opposite said flanged ring, stretching said material as it is wrapped onto the coil whereby said edge folds downwardly covering the end of said coil opposite the end covered by said ring.

5. The method of making a winding for electrical induction apparatus having a plurality of coaxial cylindrical coils connected in a series relation, said method comprising winding the spaced apart opposite end coils first in position upon a supporting cylinder, wrapping said end coils circumferentially with crepe paper of a width greater than the width of said coils, the corrugations of said crepe paper extending axially with respect to said coil, stretching said crepe paper as it is wrapped on said coils whereby the edge portions of said paper lie flat against the opposite sides of said coil and then winding the intermediate coils.

6. The method of making a winding for electrical induction apparatus having a plurality of coaxial coils connected in a series relation, said method comprising winding one coil first upon a common supporting cylinder, wrapping said coil circumferentially with elastic insulating material of a width greater than the axial width of the coil, stretching said material as it is being wrapped onto the coil whereby the edge portion of said material is caused to lie flat against and cover one end of said coil, connecting a conductor to the inner end of the first coil beneath the inner edge of the insulating material, and then winding the conductor on said cylinder to form a second coil with one end closely adjacent the covered end of said first coil.

7. A winding coil for electric induction apparatus comprising a plurality of turns of wire arranged in a plurality of layers, an insulating member having a flange portion extending across an axial surface of said coil and an integral ring portion extending over an end thereof, an insulation covering for said coil comprising a plurality of layers of crepe paper wound tightly around the outer peripheral surface of said coil, the paper being of a width greater than the width of the coil, the corrugations of the paper extending axially of the coil and an outer edge portion of the paper layers snugly overlying the end portion of said coil opposite the end covered by said ring.

JACOB J. VIENNEAU.